H. S. TARR.
LEVEL.
No. 169,927. Patented Nov. 16, 1875.
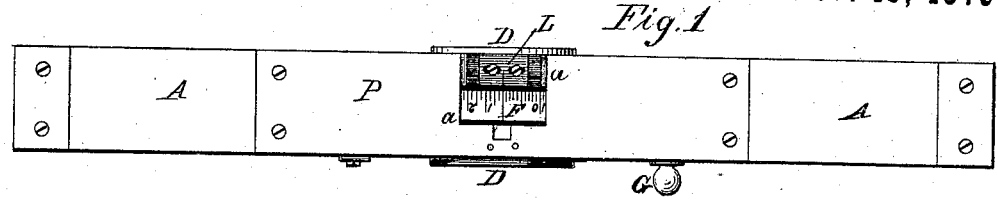
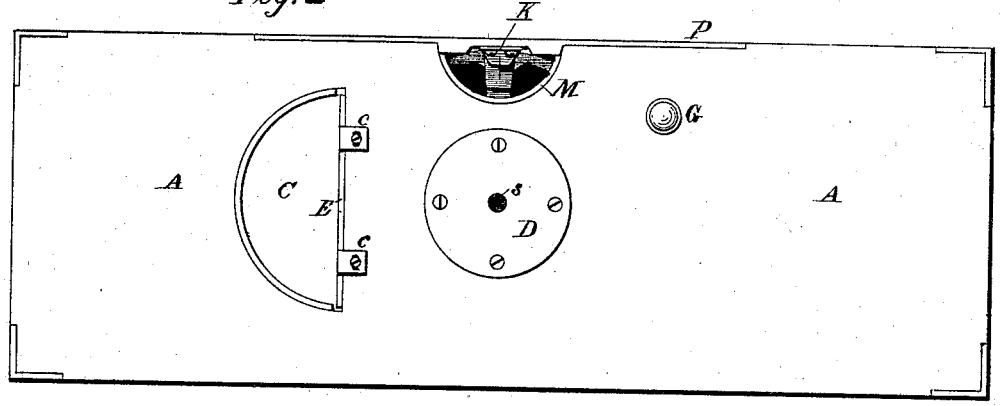
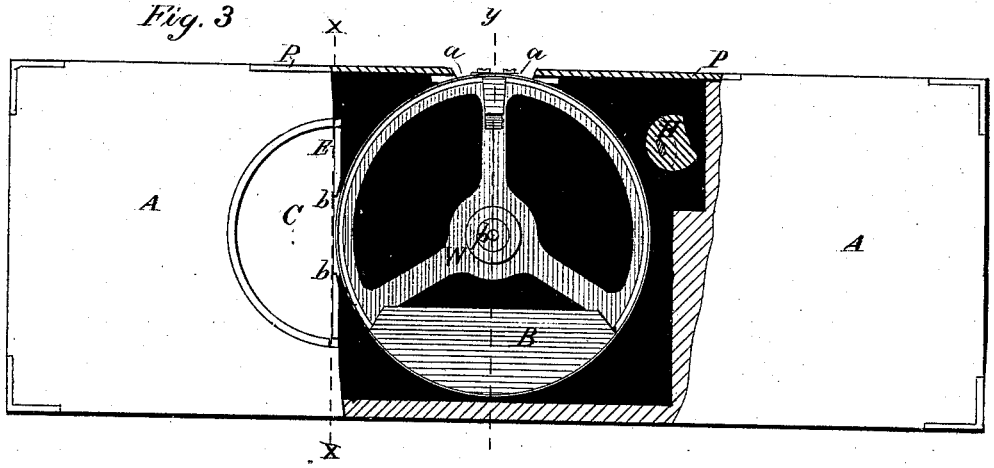
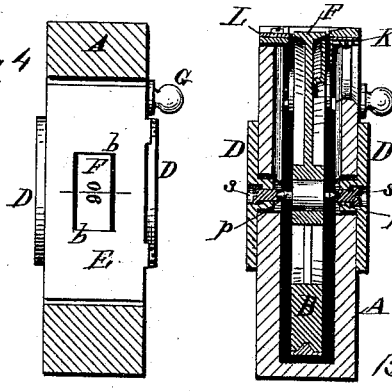
WITNESSES;
Granville Lewis
W. E. Chaffee
INVENTOR
Henry S. Tarr,
By Stansbury & Munn,
Attorneys

UNITED STATES PATENT OFFICE.

HENRY S. TARR, OF PHILADELPHIA, PENNSYLVANIA.

IMPROVEMENT IN PLUMB-LEVELS.

Specification forming part of Letters Patent No. 169,927, dated November 16, 1875; application filed September 23, 1875.

*To all whom it may concern:*

Be it known that I, HENRY S. TARR, of Philadelphia, in the State of Pennsylvania, have invented certain Improvements in Plumb-Levels; and I do hereby declare the following to be a full and correct description of the same, reference being had to the accompanying drawings, in which—

Figure 1 is a top view of the level. Fig. 2 is a side elevation of the same. Fig. 3 is a side elevation with part of the stock cut away to show the wheel and weight. Fig. 4 is a vertical section on line $x\ x$ of Fig. 3. Fig. 5 is a vertical section on line $y\ y$ of Fig. 3.

The same part is marked by the same letter of reference wherever it occurs in the drawings.

The object of the invention is to effect such improvements in the details of construction of the plumb-level as shall increase its sensitiveness and durability and enlarge the range of its adaptability to use in a variety of situations.

The improvements consist in hanging the oscillating wheel or pendulum by hardened steel pivots in adjustable screw-sockets passing through plates attached to the sides of the stock; in providing the main top plate with two adjustable plates for indicating with accuracy to the observer, looking from above or below, the correct reading of the instrument; in making the side plate adjustable for giving like accuracy to the reading of the plumb-scale; and, finally, in providing the instrument with a brake to prevent the unnecessary oscillation of the wheel during transportation, all as hereinafter more specifically set forth.

In the drawing, A marks the stock of the instrument, provided with a large mortise for the reception of the oscillating wheel W, which is hung by hardened steel pivots $p\ p$ in the adjustable screw-sockets $s\ s$, passing through the side plates D D. The wheel W is weighted at B, so as to keep that portion of its circumference at all times in a dependent position. The circumference or face of the wheel is graduated with two scales, one side being marked with degrees and the other with a scale indicating the inclination in terms of fractions of feet and inches to the foot. The side plates D are screwed to the opposite sides of the stock, and the screw-sockets $s\ s$ pass through them, and can be screwed in or out at pleasure till they have the correct relation to the pivots $p$, neither holding them too tight nor giving them too much lateral play. On top of the stock is a long plate, P, provided at its center with an opening, $a\ a$, through which the graduated face of wheel W can be observed. On the side of this opening is an adjustable gage-plate, L, attached to plate P by screws passing through longitudinal slots, by means of which the position of plate L can be accurately adjusted. To the under side of plate P is attached, in a similar manner, a small angle gage-plate, K, by means of which the indications of the instrument can be read, through a small side opening, M, from below. A large semicircular opening, G, in the stock serves as a plumb-sight, to observe, through opening $b\ b$ in plate E, the readings on the face F of wheel W. The plate E is attached to the stock by screws $c\ c$ passing through slotted lugs, which allow of the vertical adjustment of the plate.

A line on the face of plate E should coincide with the 90°-mark on wheel W, while a similar line on plate L coincides with the 0°-mark on said wheel, when the instrument is properly adjusted.

G marks the handle of the brake, by which it is turned on or off at pleasure.

The brake consists of a segmental disk, H, of india-rubber, attached eccentrically to the shaft of which G is the end.

By turning the shaft the disk can be made to bear upon the face of wheel W and prevent it from oscillating, or be made to release it when desired.

What I claim is—

1. The combination, with plate P, of the adjustable plates L and K, for the purpose of facilitating the adjustment of the instrument, and reading its indications either from above or below, as described.

2. The combination, with the plumb-sight opening C, of the open adjustable plate E, as and for the purpose set forth.

3. The combination, with the stock A and wheel W, of the brake G H, constructed and operating in the manner and for the purpose stated.

The above specification of my said invention signed and witnessed at Philadelphia this 7th day of September, A. D. 1875.

HENRY S. TARR.

Witnesses:
J. PLANKINTON,
JOHN J. MILLER.